Aug. 11, 1936.  S. OLSON  2,050,961
SCREW
Filed July 8, 1935
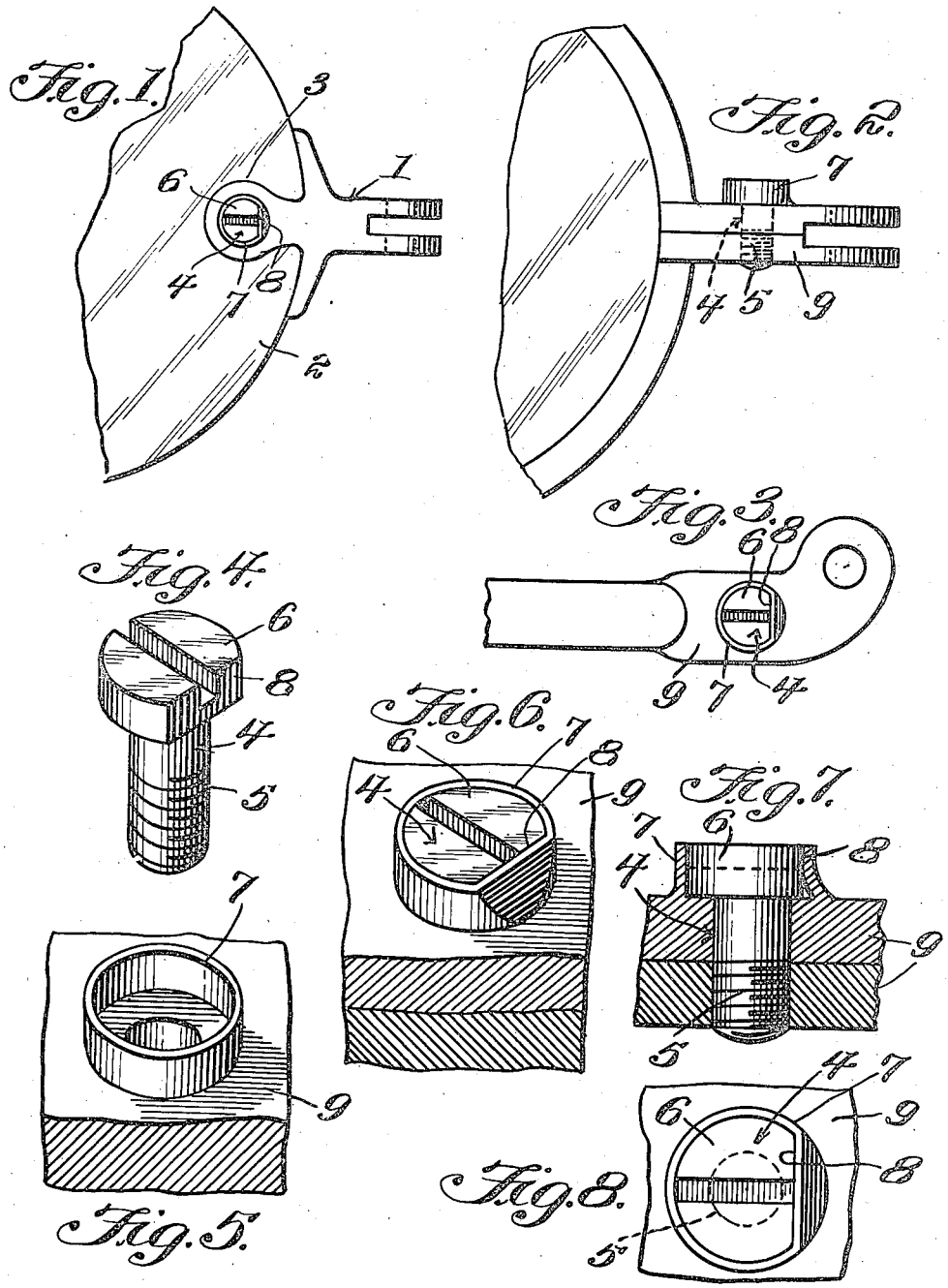
Samuel Olson
INVENTOR Patented Aug. 11, 1936

2,050,961

UNITED STATES PATENT OFFICE 2,050,961

SCREW

Samuel Olson, Glenwood, Minn.

Application July 8, 1935, Serial No. 30,392

1 Claim. (Cl. 88—47)

This invention relates to screws or fasteners for optical frames and mountings and has for the primary object the provision of a device of this character which may be easily and quickly secured against accidental removal or loosening during the use of the optical frame or mounting.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a front elevation illustrating an optical mounting secured to a lens by a fastener constructed in accordance with my invention.

Figure 2 is a similar view showing my invention adapted to an optical frame.

Figure 3 is a fragmentary plan view illustrating the same.

Figure 4 is a perspective view illustrating the fastener or screw.

Figure 5 is a fragmentary perspective view showing a cup seat for the fastener.

Figure 6 is a fragmentary perspective view showing the fastener secured by the cup seat.

Figure 7 is a fragmentary sectional view illustrating the same.

Figure 8 is a fragmentary plan view showing the same.

Referring in detail to the drawing, the numeral 1 indicates an optical mounting employed for attaching a temple bar to a lens 2. The mounting includes spaced apertured ears 3 to straddle the lens 2 and passing through the lens and the apertured ears is a screw or fastener 4 forming a part of the present invention. The fastener 4 includes a screw threaded shank 5 and a head 6. The head 6 abuts one of the ears 3 while the other ear has threaded connection with the shank 5. Formed on the ear which abuts the head 6 of the fastener is a cup 7 to receive the head 6 and the latter has a flattened face 8. To secure the fastener 4 against accidental removal, a wall of the cup 7 is bent to contact the flattened face 8 and thereby retain the fastener against rotation and consequently unthreading from the threaded ear of the mounting. While the present invention has been described in use on an optical mounting employed for connecting a temple bar to a lens, it also may be used in connection with nose pieces for securing them to lenses or may be employed on an optical frame 9, as shown in Figures 2 and 3. The cup 7 forms an integral part of the optical frame.

Having described the invention, I claim:

In combination with an optical mounting having spaced ears provided with aligned apertures and the walls of one of said apertures being screw threaded, an annular flange formed on one of the ears about the aperture thereof, a fastener including a screw threaded shank extending through the apertures and threaded to one of the ears and having a head received in and spaced from the annular flange and provided with a flattened portion to be engaged by the flange when the latter is bent inwardly towards the head to prevent loosening of the fastener from said ears.

SAMUEL OLSON.